United States Patent

[11] 3,567,979

| [72] | Inventors | Wolfgang Jaffe |
| | | Morristown; |
| | | Dwight W. Aten, Washington, N.J. |
| [21] | Appl. No. | 853,260 |
| [22] | Filed | Aug. 27, 1969 |
| [45] | Patented | Mar. 2, 1971 |
| [73] | Assignee | The Singer Company |
| | | New York, N.Y. |

[54] PERMANENT MAGNET MOTORS HAVING SPLIT POLE STRUCTURES
4 Claims, 4 Drawing Figs.

[52] U.S. Cl. .................................................. 310/187, 310/46, 310/154
[51] Int. Cl. ......................................................... H02k 23/42
[50] Field of Search ............................................. 310/185, 186, 125, 46, 211, 152, 154, 155, 187, 188, 254, 253, 259, 172, 218, 223, 224; 318/(No Search)

[56] References Cited
UNITED STATES PATENTS

| 919,458 | 4/1909 | Poth | 310/218 |
| 1,045,159 | 11/1912 | Lundell | 310/218 |
| 2,399,931 | 5/1946 | Lamborn | 310/187 |
| 3,083,310 | 3/1963 | Tweedy | 310/154 |
| 3,296,472 | 1/1967 | Fisher | 310/187 |
| 3,444,402 | 5/1969 | Cartier | 310/154 |

Primary Examiner—Milton O. Hirshfield
Assistant Examiner—R. Skudy
Attorneys—Marshall J. Breen and Chester A. Williams, Jr.

ABSTRACT: A permanent magnetic motor is disclosed in which each of the main poles is made up of two distinct parts. One part is a ceramic permanent magnet having very low permeability. The other part is made of soft steel of relatively high permeability. The armature reaction magnetomotive force (MMF) produces flux in the soft steel part related to the armature current and this flux is in a direction to add to the main flux supplied by the permanent magnet part and imparts a partial series motor characteristic to the motor without requiring a field winding. Performance of the motor is upgraded, especially when operating on rectified alternating current, due to an improved torque to current ratio for a given permanent magnet.

PATENTED MAR 2 1971　　3,567,979
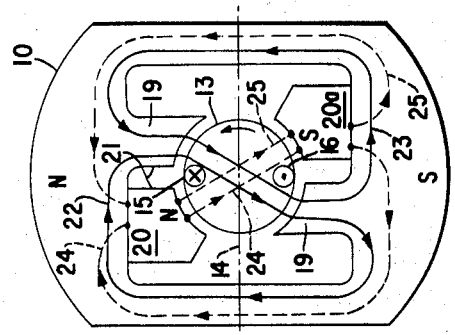
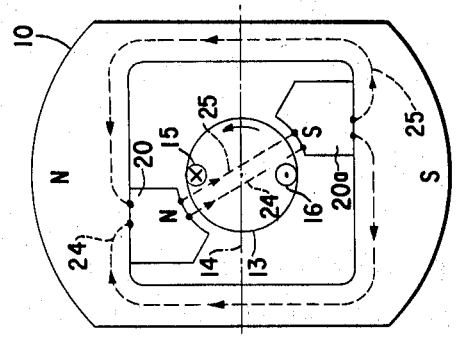
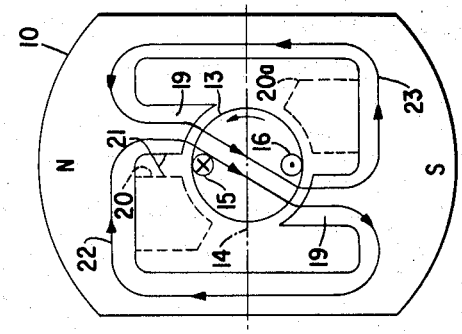
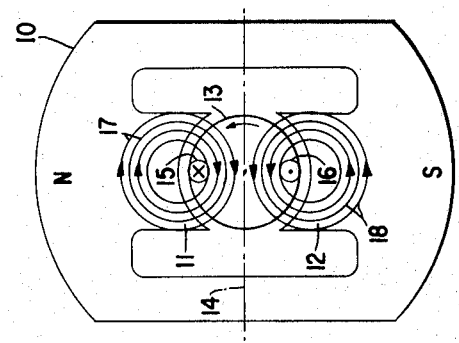
Fig. 4
Fig. 3
Fig. 2
Fig. 1 (PRIOR ART)
INVENTORS:
Wolfgang Jaffe'
Dwight W. Aten
BY
Marshall J. Breen
ATTORNEY
WITNESS:
Patrick McDonnell

PERMANENT MAGNET MOTORS HAVING SPLIT POLE STRUCTURES

BACKGROUND OF THE INVENTION

The conventional permanent magnet motor has poles of uniform homogeneous magnetic material which provide the entire main field airgap flux for the motor. The speed versus torque characteristic of such a motor is, therefore, essentially that of a shunt field motor. While it is recognized that a partial series motor characteristic may be desirable in a permanent magnet motor, so far as we are aware, no simple design parameter has heretofore been available for designing a permanent magnet motor with such a characteristic. To obtain any series field motor effect, it has been necessary to use a winding connected in series with the armature and positioned to aid the airgap flux supplied by the permanent magnet. This complicates the inherent simplicity of a permanent magnet motor and adds a winding which must be insulated and thus weakens the otherwise rugged structure of the field core.

It is an object of this invention, therefore, to provide a permanent magnet motor having a partial series field motor characteristic and without requiring a field winding.

It is a further object of this invention to provide a permanent magnet motor having a preferred path for the flux due to armature MMF which path causes flux flow in a direction to add to the main flux from the permanent magnet.

A still further object is to provide a simple structural means for modifying the performance characteristic of a permanent magnet motor without adversely affecting its inherent ruggedness.

SUMMARY OF THE INVENTION

The objects of this invention have been attained by providing a unique split-pole structure for a permanent magnet motor wherein the flux produced by the armature MMF is caused to flow in such a direction as to add to the airgap flux due to the permanent magnet.

The normal homogeneous permanent magnet pole is split circumferentially into two parts. One part remains a permanent magnet preferably of ceramic ferrite material having a permeability approximating that of air. The other part, however, is formed of soft iron or steel having relatively high permeability and may conveniently be part of the magnetic yoke forming the return path for the airgap flux. Most ordinary motors have their magnetic parts commonly formed from punchings made of "armature grade steel." This is a well-known type of silicon steel having low core losses and has been found to be successful as the high permeability material specified by this invention. The armature MMF causes most flux to flow in the easy path provided by the soft iron and thus provides an airgap flux which adds to the main flux provided by the permanent magnet.

IN THE DRAWINGS

FIG. 1 is a transverse view taken through a prior art motor showing the flux distribution in the airgap due to the armature MMF;

FIG. 2 is a transverse view taken through a permanent magnet motor embodying the present invention and showing the flux distribution due to the armature MMF;

FIG. 3 is the same as FIG. 2 except that it shows the flux distribution due to the permanent magnet; and FIG. 4 is a composite of FIGS. 2 and 3 showing the combined flux distribution.

Referring now to FIG. 1, a stator field core or yoke 10 has two homogeneous poles 11 and 12 between which an armature 13 rotates in the direction shown by the arrow. The brush axis is denoted by the dot-dash line 14 and currents flow in the armature conductors 15 and 16 as denoted by the circles. The cross denotes current flow into the conductor 15 and the dot denotes current flow out of conductor 16. While only two armature conductors 15 and 16 are shown for simplicity, it will be understood that the conductors are uniformly spaced around the periphery of the armature and that conductors lying above the brush axis have currents in the same direction as conductor 15 and that conductors lying below the brush axis have currents in the same direction as conductor 16. The net effect on the armature MMF, however, is substantially the same as though the armature ampere turns were all lumped in the one turn shown by conductors 15 and 16.

The flux path due to the currents in armature conductors 15 and 16 is denoted respectively by the lines 17 and 18 with arrows showing the direction of flux flow. The letters N and S denote the north and south polarization respectively of the field core for main field flux and this may be provided by suitable windings on the poles 11 and 12 or, in a permanent magnet motor, by forming the poles 11 and 12 wholly or partially of permanent magnet material of suitable polarity. In either case the effect of the armature MMF flux is to oppose the main field flux at the trailing pole tips and to aid the main field flux at the leading pole tips.

Referring now to FIG. 2, each of the poles which formerly were integral are now split circumferentially into two parts 19 and 20 separated by an airgap 21. The part 19, which leads the part 20 in the direction of armature rotation, is made of soft iron or steel having relatively high permeability and may conveniently be formed as part of the field core 10. The part 20 is preferably made of a ceramic ferrite material having relatively low permeability and is permanently magnetized with the polarity shown facing the armature. The part 20a is the same as part 20 except that it has the opposite polarity facing the armature. The parts 20 and 20a are shown in dashed lines in FIG. 2 because, to the armature MMF, they appear as air since they have substantially the same permeability as air.

The flux paths due to the MMF setup by currents in the armature conductors 15 and 16 are indicated by the lines 22 and 23 with the arrows showing the direction of flux flow. It will be seen that the airgap flux thus produced by the armature current is in a direction to produce useful torque output in the direction of armature rotation.

Turning now to FIG. 3, the main field flux contributed by the permanent magnet pole parts 20 and 20a is shown in dashed lines 24 and 25. The pole parts 19 are omitted from this view because very little flux from the permanent magnet parts 20 and 20a is permitted to flow in the parts 19. This is so because the MMF from each part 20 or 20a sees the high reluctance of a double airgap with respect to the flux produced thereby in parts 19. The flux denoted by lines 24 and 25 reacts on the currents in the armature conductors 15 and 16 to produce useful torque output in the direction of armature rotation.

FIG. 4, which is a superposition of FIGS. 2 and 3, shows the combined flux distribution in a split-pole permanent magnet motor of this invention. It will be seen that the flux 22 and 23 produced and determined by the armature current creates a net increase in the useful airgap flux and contributes to the production of useful torque output. Since this added useful flux is a function of the armature current, the motor will have partial series motor characteristics without requiring an actual series field winding. This is of considerable practical importance because it permits a permanent magnet motor to be designed to provide a specific speed versus torque characteristic not heretofore obtainable. This split-pole structure provides the permanent magnet motor with an important additional design parameter which does not complicate the inherent simplicity of the permanent magnet motor.

While it is of course possible to provide all kinds of motor characteristics by using windings on the high permeability sections 19 and exciting them in series or in shunt with the armature winding, the basic invention here relates to the split-pole structure having high and low permeabilities and without windings.

With regard to the split-pole structure itself, it is clear that the relative flux-carrying cross sections of the parts 19 and 20 may be varied over a wide range. The structural requirements of greatest importance, however, are as follows:

1. The airgap 21 defining the separation between the pole parts 19 and 20 should be sufficient to avoid shunting by 19 of the flux supplied by 20.
2. The pole portion 19 of high permeability should lead the low permeability portion 20 in the direction of armature rotation as shown in FIG. 4.
3. The yoke 10 should not be saturated due to the magnets 20 and 20a alone.

While one embodiment of this invention has been described in sufficient detail to enable those skilled in the art to practice this invention, it is to be understood that other embodiments may be used and that structural changes may be made in the embodiment described without departing from the scope of the invention as set forth in the claims.

We claim:

1. A split-pole structure for a permanent magnet motor having a rotating armature, comprising two circumferentially separated pole portions, one portion being a permanent magnet pole core of low permeability and the other portion being a magnetically conducting pole core of relatively high permeability, said portion of high permeability being located adjacent to and leading said permanent magnet portion in the direction of armature rotation.

2. A split-pole structure in accordance with claim 1 in which the permanent magnet pole core is made of ceramic ferrite material and the magnetically conducting pole core is made of armature grade steel.

3. A permanent magnet electric motor comprising the combination of:
    an annular yoke of magnetic material;
    permanently magnetized pole cores of ceramic ferrite material mounted on an inwardly facing surface of said yoke and having pole faces directed radially toward the center of said yoke;
    an armature with circumferentially spaced conductors thereon mounted to rotate within said yoke and between said pole cores; and
    steel pole cores of relatively high permeability extending radially inwardly from the yoke and positioned adjacent to but separated from the permanently magnetized pole cores on the leading sides thereof in the direction of armature rotation.

4. A permanent magnet electric motor comprising; and magnetic yoke having permanent magnet pole cores of relatively low permeability providing the main flux field, an armature winding mounted for rotation in said flux field, means providing current flow in said armature winding to produce said rotation, and magnetically conducting pole cores of relatively high permeability located adjacent to the permanent magnet poles on the side thereof leading in the direction of armature rotation, said magnetically conducting pole cores providing a preferred path for the flux produced by the armature current and in a direction to add to the main field flux.